(12) United States Patent
Bible, Jr. et al.

(10) Patent No.: US 8,639,626 B2
(45) Date of Patent: *Jan. 28, 2014

(54) ENCRYPTED E-COMMERCE PRODUCT

(75) Inventors: Robert Bible, Jr., Rancho Santa Fe, CA (US); Mark Steven Burnett, La Jolla, CA (US)

(73) Assignee: O'Hastiner SVC. Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/829,690

(22) Filed: Jul. 2, 2010

(65) Prior Publication Data

US 2010/0274724 A1    Oct. 28, 2010

Related U.S. Application Data

(63) Continuation of application No. 10/371,616, filed on Feb. 19, 2003, now Pat. No. 7,788,177.

(51) Int. Cl.
*G06F 21/00* (2013.01)

(52) U.S. Cl.
USPC .............. 705/51; 705/30; 705/50; 705/75

(58) Field of Classification Search
USPC .......................................................... 705/51
See application file for complete search history.

(56) References Cited

U.S. PATENT DOCUMENTS

| | | | |
|---|---|---|---|
| 5,706,502 A | 1/1998 | Foley et al. | |
| 5,727,129 A | 3/1998 | Barrett et al. | |
| 5,761,663 A | 6/1998 | Lagarde et al. | |
| 5,768,528 A | 6/1998 | Stumm | |
| 5,832,522 A | 11/1998 | Blickenstaff et al. | |
| 5,838,812 A | 11/1998 | Pare, Jr. et al. | |
| 5,850,442 A | 12/1998 | Muftic | |
| 5,960,411 A | 9/1999 | Hartman et al. | |
| 5,991,748 A | 11/1999 | Taskett | |
| 6,332,025 B2 | 12/2001 | Takahashi et al. | |
| 6,424,706 B1 | 7/2002 | Katz et al. | |
| 6,856,976 B2 | 2/2005 | Bible et al. | |
| 7,020,697 B1 | 3/2006 | Goodman et al. | |
| 2002/0038291 A1 | 3/2002 | Petersen et al. | |
| 2002/0198764 A1* | 12/2002 | Schorno et al. | 705/10 |
| 2006/0069926 A1* | 3/2006 | Ginter et al. | 713/194 |

FOREIGN PATENT DOCUMENTS

| | | | |
|---|---|---|---|
| JP | 2007164547 A | 6/2007 | |
| JP | 2007249630 A | 9/2007 | |

OTHER PUBLICATIONS

Arnold, Stephen E., The key to security, Apr. 1996, Upside Publishing Company, vol. 8, Issue 4, pp. 78-84.*

* cited by examiner

*Primary Examiner* — Peter Choi
*Assistant Examiner* — Alexis Casey
(74) *Attorney, Agent, or Firm* — Brundidge & Stanger, P.C.

(57) ABSTRACT

A system for conducting a financial transaction in e-commerce on the internet includes objects prepared by a seller and a buyer. The seller's object includes a clear text header file (advertisement), an encrypted overhead file which contains verification data pertaining to the financial transaction, and an encrypted content file containing the subject matter for sale by the seller. With a purchase solicitation from the buyer, an overhead key can be used by a transaction agency to ensure there is a compliance between the purchase solicitation and the verification data of the overhead (from seller's object). Next a revelation key is provided to give the buyer access to the content when such compliance has been ensured.

10 Claims, 1 Drawing Sheet

ENCRYPTED E-COMMERCE PRODUCT

CROSS-REFERENCE TO RELATED APPLICATIONS

This application is a continuation of U.S. application Ser. No. 10/371,616, filed Feb. 19, 2003, wherein the contents of the above listed application is hereby incorporated by reference.

FIELD

The present invention pertains generally to e-commerce transactions on the internet. More particularly, the present invention pertains to objects that can be presented on the internet in an electronic information format. The present invention is particularly, but not exclusively useful as a device and method for concealing selected objects in e-commerce in a way that will safeguard a relatively low-dollar-value financial transaction on the internet.

BACKGROUND

In a twist from the normal over-the-counter commercial transaction between a buyer (customer) and a seller (merchant), the possibility of an e-commerce transaction involving the sale of information goods on the internet presents some unique issues for consideration. Specifically, these issues stem from the fact that the transfer of information goods in e-commerce can be accomplished electronically over an internet system that is openly accessible by the public.

Typically, in order to place information goods on the world wide web (internet), a content creator (e.g. an artist, author, or any other web page owner), will arrange his/her text in files following the rules of the hypertext markup language (HTML). More specifically, the HTML file that is created by the content creator can contain text that is to be displayed at the web site, instructional text (e.g. font tags or image display tags), other discretionary non-displayed information, and text which becomes links to downloadable files or other web sites. These files are then placed in a directory on a web server where they become pages on the web site of the content creator. As indicated, some of these pages are viewable by anyone having an internet browser.

If the artist (content creator) of a web page, has content for which he/she does not expect compensation, the artist merely puts the files he/she has created into directories on the web server. Subsequently, whenever a computer user's browser program displays the HTML file, and the computer user desires to download this file, the computer user merely clicks onto a link that will download the file. Non-HTML files may be handled by another application or simply downloaded and saved. Thus, there are several types of informational objects that are available for downloading.

With the above in mind, it is apparent that unlike a face-to-face, over-the-counter commercial transaction, wherein the seller (content creator) has a potential for direct control over a product until the product has been sold, a seller (content creator) in e-commerce on the internet has no such inherent control. The situation is further complicated by the fact that, also unlike a face-to-face, over-the-counter transaction, a seller (content creator) that is presenting a downloadable product on-line, in e-commerce, has no direct ability to ensure that he/she has received monetary compensation from the buyer for the product. In many instances, however, a seller in e-commerce (content creator) may want to sell his/her content directly, in a purely information format, to those who browse the internet. Presently, simple web pages which are created by individual artists (content creators) do not have the ability to process credit card information. Moreover, credit card transaction costs are relatively expensive, and therefore encourage larger-value transactions. Low-dollar-value transactions, on the other hand, need to be sufficiently low to discourage file-sharing. The problem, however, is that there is now no simple mechanism for passively releasing low-dollar-value information goods to a buyer after a purchase, and after verification of payment. Thus, some form of protection for such low-dollar-value transaction in e-commerce on the internet is obviously necessary.

As is well known, electronic information objects can be displayed at a web site on the internet in various formats (e.g. mp3). Further, it is well known that electronic information objects in these formats can be concealed or obscured from public scrutiny by using various codes, or devices, or combinations thereof. Unfortunately, given sufficient time and a worthwhile incentive, any of these codes or devices can be compromised by the unscrupulous user of the internet. Insofar as a commercial transaction is concerned, even though codes and devices may be effective, there are still issues concerning how the transaction is to be implemented. Specifically, how can a seller be assured he/she will actually receive compensation for his/her product when it is sold on-line over the internet? More specifically, how can a seller be assured he/she will actually receive compensation for his/her product when the product is in an electronic information format that can be directly downloaded from the internet at the buyer's location?

Heretofore, products that have been presented for sale on the internet have been presented through so-called "portals" that have internet computers with e-commerce servers that can bill to a credit card. Typically, however, these products are not in an electronic information format that is susceptible or desirable for direct downloading from the internet (e.g. high-dollar-value products such as mechanical/electrical/chemical products, CDs, books, etc.). On the other hand, low-dollar-value products which are in an electronic information format, and which are downloadable, have been provided free, albeit laden with appropriate advertising for other goods or services. In these instances, the authors or artists who have produced the work are only indirectly or poorly compensated for their work.

In light of the above, it is an objective of the present invention to provide a device and method for conducting a financial transaction in e-commerce wherein an object (e.g. a downloadable product) is prepared and provided for sale on the internet by an individual seller, wherein a buyer initiates the transaction, and wherein the transaction is facilitated and implemented by the manipulation of the object by a transaction agency. Another objective of the present invention is to provide a device and method for conducting a secure financial transaction of downloadable products in e-commerce that is effectively tamper-proof and which releases the product to a buyer only after payment has been verified. Yet another objective of the present invention is to provide a device and method for conducting a secure financial low-dollar-value transaction which discourages file sharing and which provides the seller (content creator) with a higher percentage of the transactional proceeds. Still another objective of the present invention is to provide a device and method for conducting a financial transaction in e-commerce that is simple to implement, easy to use and comparatively cost effective.

SUMMARY

In accordance with the present invention, a device and method for conducting a secure financial transaction in e-commerce on the internet requires the use of variously concealed, interactive files, components of files, or combinations thereof. Importantly, all of these files can be presented as objects or parts of objects on the internet in an electronic information format. For definitional purposes, the term "file" shall mean a named set of data items that can be stored in a machine readable form. Further, the term "object" shall mean a file, or a combination of files, that will permit performance of the various tasks that are required by a program. For example, one component file of an object may be the displayed text of a link in an HTML file. Other component files of the object may then be found in the linked file. Thus, together these files will function as an object to perform various tasks.

In general, for the present invention, a seller first creates the various files of an object that are needed to complete a sale on the internet (hereinafter sometimes referred to as the seller's object). A buyer will then select for purchase the subject matter that is presented by the seller and, using pertinent files from the seller's object, will create an object that is used to initiate the transaction (hereinafter sometimes referred to as the buyer's object). Next, using the buyer's object, a transaction agency facilitates and implements the financial transaction between the seller and the buyer. Importantly, until all of the administrative aspects of the financial transaction have been verified by the transaction agency, these administrative aspects, and the subject matter that is for sale, remain concealed and inaccessible to the public. In accordance with the present invention the seller's object that is required to complete the transaction contains essentially three files.

A first file of the seller's object, which is also referred to herein as a header, is effectively an advertisement for the subject matter (product) that is being offered for sale. The header will most likely be in clear text so that a potential buyer is able to see and evaluate the product. For this purpose, the header can include advertising and informational material about the subject matter (product), suggested prices, as well as informational material about the seller. Further, the header can include actual portions of the subject matter, if desired.

A second file in the seller's object, which is referred to herein as an overhead, contains verification data that pertains to the financial transaction. As contemplated for the present invention, the verification data of the overhead will include commercial material about the product, such as pricing and payment terms. Also, it may contain such information as the minimum allowed payment, the seller's accounting identification, and information which ensures the subject matter (product) is intact. Further, the verification data of the overhead may also contain the number of times the subject matter (product) may be accessed over the internet, an expiration date, and financial information about the buyer (e.g. a buyer's account identification in the event the subject matter is intended for a single buyer). Importantly, the overhead will also include a revelation key that is to be used as discussed in detail below. As intended for the present invention, the verification data and the revelation key in the overhead are concealed from public access.

A third file in the seller's object, referred to herein as the content, is prepared by the seller in an electronic information format and, importantly, is concealed. It is this third file of the seller's object (i.e. content) that contains the actual subject matter (product) that is being presented for sale. As indicated above, the content is somehow concealed from potential buyers until after the transaction agency has determined there is compliance between the purchase solicitation from the buyer and the verification data in the overhead.

If a buyer decides to purchase the product described in the header, the buyer will "click on" a link (e.g. a logo at the internet website). By "clicking on" this link, the seller's object is downloaded onto the buyer's computer and the buyer establishes communication with the transaction agent. Alternatively, the seller's object could have been downloaded to the buyer's computer as part of an email, or from an ftp site. The seller's object could also reside on a portable storage device. In any case, the buyer may then "click on" or otherwise select the object, initiating the purchase. Also, at this time the buyer effectively creates a file (included in the buyer's object) that will constitute a purchase solicitation. Specifically, the purchase solicitation notifies the transaction agency of the buyer's intention to purchase the product. In more detail, the purchase solicitation will normally be encrypted by the buyer and will, typically, include the identification of the buyer, a buyer's password, and the amount he/she is willing to pay. The purchase solicitation may also include the time of the solicitation, the file name of the subject matter (product) that the buyer wants to purchase, and information that can be used to verify that the subject matter (product) which is being purchased is, in fact, the correct subject matter (product). Depending on the operational parameters of the transaction, the purchase solicitation may contain the header of the seller's object and, possibly, other files from the seller's object.

The overhead file of the seller's object of the present invention can be concealed from public access in any of several ways. Preferably, however, the overhead will be encrypted. Access to the verification data will then require the use of an overhead key. As envisioned for the present invention this overhead key can be either of two types of key. For one, the overhead key may be the private part of a public-private key pair, which can be used only by the transaction agency. For another, the overhead key may be a symmetric key that is established by prior arrangement between the transaction agency and the seller. In either case, the overhead key is to be used by only the transaction agency, to give the transaction agency access to the overhead. As indicated above, this is done in response to a purchase solicitation from a buyer.

Whenever there is a purchase solicitation from a buyer, the transaction agency uses the overhead key to access the overhead. The transaction agency then uses the verification data in the overhead file to evaluate the purchase solicitation and determine whether the buyer is authentic. More specifically, the transaction agency will determine whether the particular buyer is a qualified and capable purchaser. Stated differently, the transaction agency will determine whether there is compliance between the purchase solicitation and the verification data. If there is compliance, the buyer will be provided with the revelation key that allows him/her to access the third file (content) of the seller's object.

Concealment of the content in the seller's object can be accomplished in several ways. Preferably, the content of the seller's object is encrypted. On the other hand, the content can be obscured in some manner. In either case, the revelation key mentioned above is required in order for the buyer to access this third file (content). If the content has been encrypted, the revelation key is preferably a symmetric key. On the other hand, if the content has been obscured, the revelation key may be instructions to the buyer on how to remove the obscuration. Another possibility is that the revelation key is merely a set of directions to the location of other keys that may be used to access the content. Importantly, for all of the variations of the revelation key, the revelation key is preferably presented in the overhead and is made available to the buyer by the transaction agency.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
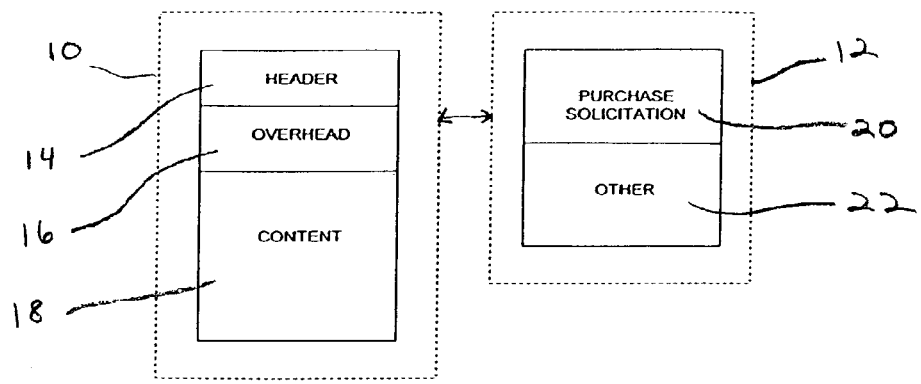
FIG. 1 is a schematic of the component files in a seller's object, and in a buyer's object, that establish the programs necessary for completion of a commercial transaction in accordance with the present invention.

Referring initially to FIG. 1, a seller's object in accordance with the present invention is shown and is generally designated 10. Also shown in FIG. 1 is a buyer's object which is designated 12. For the purposes of the present invention, the seller's object 10, and the buyer's object 12, both include electronic information files that are used interactively in e-commerce on the internet to effect a secured financial transaction. In detail, and still referring to FIG. 1, it will be seen that the seller's object 10 includes, essentially, three different files. These are: a first file 14 (also referred to herein as a "header"), a second file 16 (also referred to herein as an "overhead"), and a third file 18 (also referred to herein as a "content"). For purposes to be discussed below, the first file 14 is typically created in clear text, while both the second file 16, and the third file 18 are either encrypted or otherwise somehow obscured. As also shown in FIG. 1, the buyer's object 12 will contain a file, named here as a "purchase solicitation" 20. Further, the buyer's object 12 comprises "other" files 22. Specifically, these other files 22 will include, at least, the second file (overhead) 16 from the seller's object 10.

Figure 2:
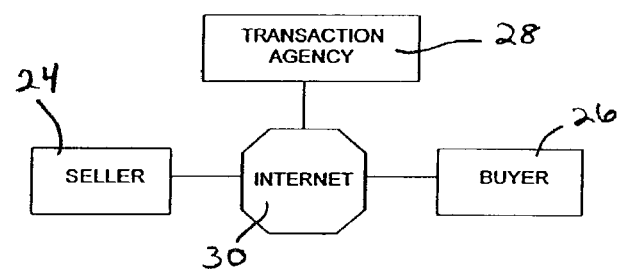
FIG. 2 is a schematic representation of the parties that are involved in a commercial transaction that is conducted in accordance with the present invention.

Referring now to FIG. 2, it will be seen that the parties to a financial transaction in accordance with the present invention include a seller 24, a buyer 26 and a transaction agency 28. As shown, these parties can be electronically connected to each other via the internet 30. Importantly, the primary purpose of the transaction agency 28 is to facilitate a financial transaction between the seller 24 and the buyer 26. Insofar as the seller 24 is concerned, for such a transaction it is only necessary that the seller's objects 10 be available. Nevertheless, the seller 24 may also want to provide the transaction agency 28 with pertinent accounting and cryptographic information that will allow the parties to reconcile the transaction.

Figure 3:
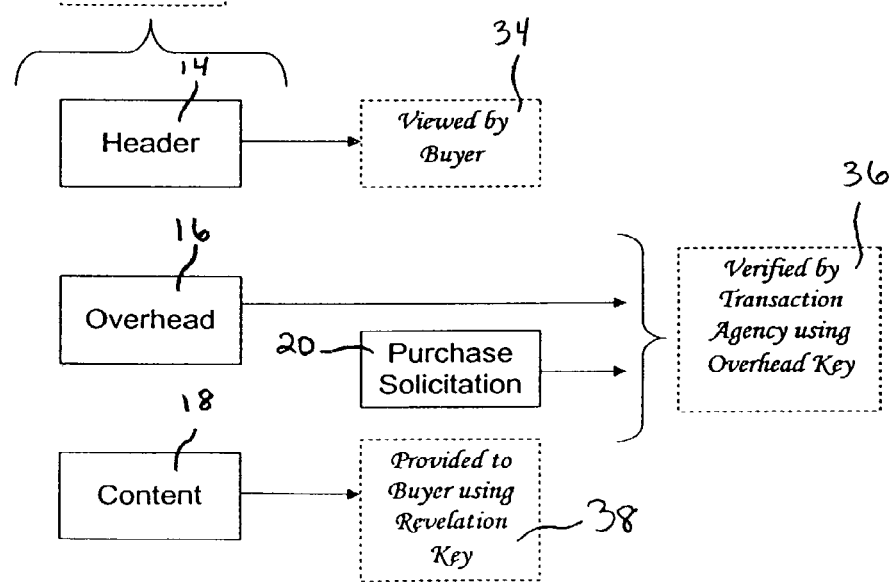
FIG. 3 is a schematic showing the interaction of object files and the file users (parties) during a commercial transaction in accordance with the present invention.

In order to effect a financial transaction in accordance with the present invention, the action block 32 in FIG. 3 indicates it is first necessary for the seller 24 to create the seller's object 10. The header 14 of this object 10, as indicated above, is effectively an advertisement for the content 18 that is being offered for sale. When displayed on the internet 30, the header 14 will be in clear text so that a potential buyer 26 is able to see and evaluate the product as indicated by the action block 34 in FIG. 3. For this purpose, the header 14 can include advertising and informational material about the content 18, as well as suggested prices and informational material about the seller 24. Further, the header 14 can include displayed portions of the content 18.

Whenever a buyer 26 decides to purchase the content 18 that is described in the header 14 on the internet 30, the buyer will "click on" a link (e.g. a logo at the internet website). With this action, several functions are implemented. For one, the overhead 16 of the seller's object 10 is downloaded to the buyer 26. The buyer 26 then creates a buyer's object 12 that includes the overhead 16 from the seller's object 10 and a purchase solicitation 20. Another implementation function is that communications are established between the buyer 26 and the transaction agency 28. Specifically, the purchase solicitation 20 notifies the transaction agency 28 of an intention by the buyer 26 to purchase the content 18. Further, the buyer's object 12 may be encrypted by the buyer 26. Typically, the purchase solicitation 20 will include the identification of the buyer 26, a buyer's password, and the amount the buyer 26 is willing to pay for the content 18. The purchase solicitation 20 of the buyer's object 12 may also include the time of the solicitation, the file name of the content 18 that the buyer 26 wants to purchase, and information that can be used to verify that a correct and complete content 18 is being purchased. Depending on the operational parameters of the transaction, in addition to the purchase solicitation 20, the buyer's object 12 may contain "other" files 22. For example, in these "other" files 22, the buyer 26 will include the overhead 16 from the seller's object 10 and may be required to include the header 14 from the seller's object 10. In sum, the purchase solicitation 20, and other files 22 in the buyer's object 12, are submitted to the transaction agency 28 for verification of the transaction as indicated by the action block 36 in FIG. 3.

The action block 36 in FIG. 3 shows that the purchase solicitation 20 from the buyer 26 is verified with the overhead 16 from the seller's object 10. Specifically, as contemplated for the present invention, the verification data of the overhead 16 will include commercial material about the content 18, such as pricing and payment terms. Also, it may contain such information as the minimum allowed payment, the seller's accounting identification, and information which ensures the content 18 is intact. Further, the verification data of the overhead 16 may also contain the number of times the content 18 may be accessed over the internet 30, an expiration date, and financial information about the buyer 26 (e.g. a buyer's account identification in the event the content 18 is intended for a single buyer 26). Importantly, the overhead 16 will also include a revelation key (not shown). As intended for the present invention, the verification data and the revelation key in the overhead 16 are concealed from public access.

According to the present invention, the overhead 16 of the seller's object 10 is preferably concealed from public access by encryption. Access to the verification data will then require the use of an overhead key (not shown). As envisioned for the present invention this overhead key can be either of two types of key. For one, the overhead key may be the private part of a public-private key pair, which can be used only by the transaction agency 28. For another, the overhead key may be a symmetric key that is established by prior arrangement between the transaction agency 28 and the seller 24. In either case, the overhead key is to be used by only the transaction agency 28, to give the transaction agency 28 access to the overhead 16. As indicated above, this is done in response to a purchase solicitation 20 from a buyer 26.

The transaction agency 28 then uses the overhead key to access the overhead 16 in order to use the verification data in the overhead 16 to evaluate the purchase solicitation 20. More specifically, the transaction agency 28 will determine whether the particular buyer 26 is a qualified and capable purchaser (action block 36). After verification, the buyer 26 will be provided with the revelation key that allows him/her to access the content 18.

A file for content 18 in the seller's object 10, is also concealed by the seller 26. Specifically, it is the content 18 of the seller's object 10 that contains the actual subject matter (product) that is being presented for sale to the buyer 26. Importantly, until after the transaction agency 28 has determined there is compliance between the purchase solicitation 20 from the buyer 26 and the verification data in the overhead 16, there is still no transaction. In order to maintain the security of the content 18 until the transaction has been approved by the transaction agency 28, concealment of the content 18 in the seller's object 10 can be accomplished in several ways. Preferably, the content 18 is encrypted, but it can also be otherwise obscured. If the content 18 has been encrypted, the revelation key is preferably a symmetric key. On the other hand, if the content 18 has been obscured, the revelation key may be instructions to the buyer 26 on how to remove the obscuration, or it may be merely a set of directions to the location of other keys that can be used to access the content 18. Importantly, for all of the variations of the revelation key, the revelation key is preferably presented in the overhead 16 and is made available to the buyer 26 after compliance has been verified by the transaction agency 28. Once the buyer 26 has been presented with the revelation key, the content 18 can be decrypted or otherwise revealed, as indicated by the action block 38 in FIG. 3.

While the particular Encrypted E-Commerce Product as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for conducting a transaction on a computer network, comprising:
    receiving, by a first computer, an overhead key from a seller computing device, the first computer configured to conduct a transaction on a network between the seller computing device and a buyer computing device, the overhead key configured to permit access to a seller verification data,
    wherein the seller verification data comprises a header file in clear text for display on the network, and
    wherein the overhead key is a private part of a public-private key pair;
    receiving, by the first computer, a buyer's object from the buyer computing device, the buyer's object comprising the seller verification data and a purchase solicitation, the purchase solicitation comprising a buyer verification data,
    wherein the seller verification data is incorporated into the buyer's object from a seller's object in response to actuation by the buyer computing device, the seller object comprising the seller verification data and a seller content in an electronic information format;
    accessing, by the first computer, the seller verification data;
    comparing, by the first computer, the seller verification data and the buyer verification data to evaluate compliance; and
    providing, to the buyer computing device, access to the seller content dependent on the compliance.

2. The method of claim 1 wherein the providing access comprises providing a revelation key.

3. The method of claim 1 wherein the seller's object further comprises an advertisement presented without concealment.

4. The method of claim 1 wherein the providing access comprises providing a set of directions to the location of a revelation key.

5. The method of claim 2 wherein the seller content is concealed by being encrypted such that the revelation key is required to reveal the seller content.

6. A non-transitory tangible computer readable medium including instructions stored thereon that, in response to execution by a computing device, cause the computing device to perform the instructions comprising:
    instructions to receive, by a first computer, an overhead key from a seller computing device, the first computer configured to conduct a transaction on a network between the seller computing device and a buyer computing device, the overhead key configured to permit access to a seller verification data,
    wherein the seller verification data comprises a header file in clear text for display on the network, and
    wherein the overhead key is a private part of a public-private key pair;
    instructions to receive, by the first computer, a buyer's object from the buyer computing device, the buyer's object comprising the seller verification data and a purchase solicitation, the purchase solicitation comprising a buyer verification data,
    wherein the seller verification data is incorporated into the buyer's object from a seller's object in response to actuation by the buyer computing device, the seller object comprising the seller verification data and a seller content in an electronic information format;
    instructions to access, by the first computer, the seller verification data;
    instructions to compare, by the first computer, the seller verification data and the buyer verification data to evaluate compliance; and
    instructions to provide, to the buyer computing device, access to the seller content dependent on the compliance.

7. The method of claim 6 wherein the instructions to provide access comprises instructions to provide a revelation key.

8. The method of claim 6 wherein the seller's object further comprises an advertisement presented without concealment.

9. The method of claim 6 wherein the instructions to provide access comprises instructions to provide a set of directions to the location of a revelation key.

10. The method of claim 7 wherein the seller content is concealed by being encrypted such that the revelation key is required to reveal the seller content.

* * * * *